M. W. BIRD.
DOOR KNOB.
APPLICATION FILED MAY 1, 1917.
1,308,325.
Patented July 1, 1919.
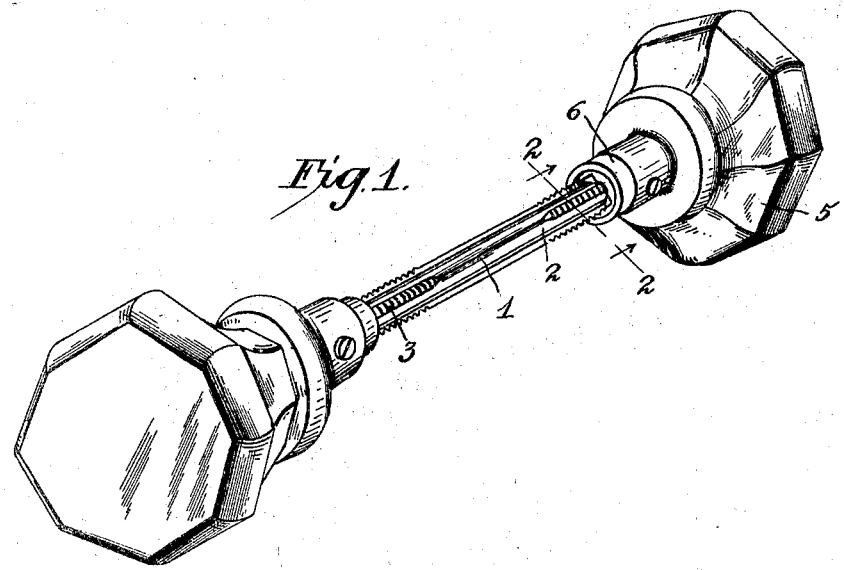
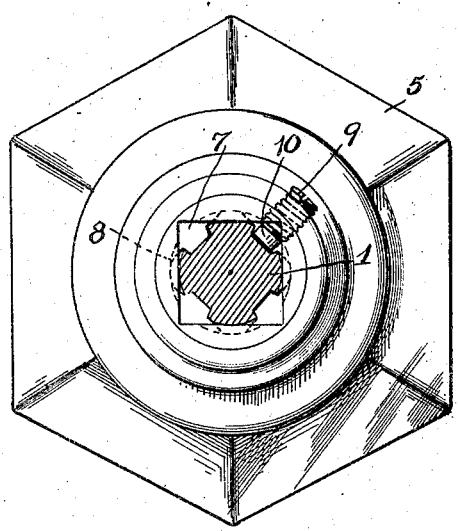
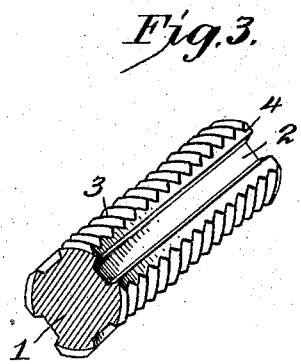
Inventor
M. W. Bird
By
Attorneys,

UNITED STATES PATENT OFFICE.

MILTON W. BIRD, OF WENATCHEE, WASHINGTON.

DOOR-KNOB.

1,308,325.     Specification of Letters Patent.     Patented July 1, 1919.

Application filed May 1, 1917. Serial No. 165,769.

*To all whom it may concern:*

Be it known that I, MILTON W. BIRD, a citizen of the United States, residing at Wenatchee, in the county of Chelan and State of Washington, have invented certain new and useful Improvements in Door-Knobs, of which the following is a specification.

This invention relates to door knobs and more particularly to a means for securing a knob upon its spindle in the desired position of adjustment.

The present invention has as its object to provide means for securing a door knob upon its spindle in the desired position of adjustment, which means will permit of convenient, rapid, and repeated adjustment of the knob upon the spindle and locking of the same in place when the desired adjustment has been secured.

Another aim of the invention is to provide for a fine degree of adjustment for the knob shank upon the spindle, which adjustment may be quickly secured, the means providing for such adjustment possessing all of the advantages of a threaded adjustment, without, however, presenting any of the disadvantages incident to the breaking down of the threads upon the spindle.

In the accompanying drawings:

Figure 1 is a perspective view of the device embodying the present invention;

Fig. 2 is a vertical transverse sectional view on the line 2—2 of Fig. 1;

Fig. 3 is a sectional perspective view of one end of the spindle.

In the drawings, the numeral 1 indicates in general the knob spindle which, while it may be of any desired polygonal form, is here shown as substantially rectangular in cross section. For a purpose to be presently explained this spindle is formed in each of its faces with a longitudinally extending groove or channel, indicated by the numeral 2, and the corners of the spindle between adjacent faces are formed with short screw threads, indicated by the numeral 3. In other words, the spindle is threaded in such manner that the threads will be formed solely in the corners thereof. Inasmuch as the threads or teeth 3 are formed solely in the corners of the spindle, the ends of the said threads or teeth will occupy the same planes as the respective faces of the spindle, or in other words, they will be in a sense, beveled at their ends, as indicated by the numeral 4. Thus the spindle is of polygonal form except that its corners are slightly rounded due to the formation of the said threads or teeth.

The knob to be mounted upon the spindle is indicated in general by the numeral 5 and is provided with a shank, indicated by the numeral 6, the said shank having a polygonal bore 7 which corresponds to the cross sectional shape of the spindle and is, therefore, in the present instance, rectangular. This bore 7 is, furthermore, of such dimensions that when the spindle 1 is presented to the end of the bore with its faces facing the walls of the bore, the shank 6 may be slipped on to the spindle to the desired position of adjustment. In any suitable manner the walls of the bore 7 have their intermediate portions threaded, as indicated by the numeral 8. When the bore of the shank is formed with screw threads in its walls, these threads will, of course, correspond in size and pitch with the threads upon the knob spindle so as to receive the latter threads when the shank has been fitted on to the spindle and is given an eighth turn. It will now be understood that in applying the knob the shank thereof is presented endwise to the spindle and in such position that the faces of the spindle will face the walls of the bore in the shank whereupon the knob is slid on to the spindle until it has assumed the desired position of adjustment. The knob is then given an eighth turn in either direction so that the threaded corners of the spindle will be presented to the walls of the bore and the threads 3 will engage and mesh with the threads 8. In order that the knob shank may be held in its position of adjustment a set screw 9 is threaded through the knob shank in such position that its inner end, which is unthreaded, as indicated by the numeral 10, will enter the bore of the shank in the angle or corner between two adjacent walls of the said bore. The said end 10 of the set screw is, as stated, unthreaded and smooth and of a diameter to snugly fit within any one of the grooves or channels 2. Consequently, as the set screw is tightened the inner end of the same will enter the adjacent groove or channel in the spindle and the shank will be securely held against rotation in either direction upon said spindle and, therefore, the threads 3 cannot become disengaged from the threads 8 and the adjustment will be maintained until the set screw is threaded out the proper distance to permit of rotation of the shank upon the said spindle. The fact will be appreciated that inasmuch as the set screw enters the bore at the angle or corner between two adjacent walls of the bore and when tightened does not in any way engage the threads 3, these threads will not be mutilated and, therefore, the knob may be repeatedly adjusted.

Having thus described the invention, what is claimed as new is:—

In a device of the class described, a knob shank having a polygonal socket formed in its walls with threads terminating short of the corners between said walls, a polygonal spindle of dimensions less than the dimensions of the socket, the said spindle being formed in its corners with threads to fit the first-mentioned threads when the corners of the spindle are opposite the walls of the socket and to disengage from the said threads when the spindle and shank are relatively rotated to present the corners of the spindle to the corners of the shank socket, each face of the spindle being formed with a longitudinally extending groove, the ends of the screw threads being beveled whereby to be flush with the faces of the spindle and the outer edges of the screw threads being transversely curved concentric to the axis of the spindle, and a set screw threaded through the shank with its inner end entering the said socket in the angle between the two adjacent walls of the socket and when tightened bearing against the adjacent face of the shank between the threads at the corners of said face and seating in the respective groove.

In testimony whereof I affix my signature.

MILTON W. BIRD.

Copies of this patent may be obtained for five cents each, by addressing the "Commissioner of Patents, Washington, D. C."